Patented Feb. 19, 1946

2,395,271

UNITED STATES PATENT OFFICE 2,395,271

PRODUCTION OF MODIFIED FEATHERS

Erik Havemann, Chicago, Ill., assignor to Burton-Dixie Corporation, Chicago, Ill., a corporation of Delaware No Drawing. Original application May 29, 1939, Serial No. 276,443. Divided and this application February 21, 1940, Serial No. 320,012

1 Claim. (Cl. 8—94.10)

Feathers accumulated in connection with poultry-raising operations on the farm have been used in bed-furnishings, such as pillows, mattresses and the like, over a long period and their employment in this connection doubtless originated as a household art.

A commercial feather industry of great magnitude has been developed in recent years which employs as its raw material feathers occurring as by-products in the large-scale operations of preparing poultry for the market.

In view of the fact that such feathers are initially handled with less care than was possible in the home or on the farm, it has been necessary to develop methods of cleaning and sterilizing these feathers on a scale commensurate with the size of the industry.

To prepare such feathers in a cleanly and sanitary fashion proper to warrant their employment in bedding products of the various types, steam, water, detergents and other chemical agents have been used in connection with various mechanical devices to produce such result; but, one unsatisfactory property of the feathers has never been successfully modified and this has caused some objection to their use in bedding products because of the intimate proximity to the vital respiratory organs of the user.

Notwithstanding the efforts exerted by the industry and the various resulting methods developed for the cleansing of the feathers, even those most carefully prepared generate obnoxious odor when exposed to a combination of relatively high atmospheric humidity and temperature, such as occurs frequently in the southwestern gulf states and occasionally elsewhere in the United States and other countries.

This odor is especially undesirable in feathers used for pillows and the industry has made strenuous, but heretofore unsuccessful, efforts to modify their purification procedures in order to produce feathers capable of remaining permanently non-odorous under all climatic conditions likely to be encountered. The fact that feathers which have been completely freed from foreign matter, and, therefore, could be considered absolutely clean, would still cause obnoxious odor under the above-mentioned climatic condition led me to assume that the odor originated with the substance of the feather as there was nothing present but pure feather material. I made numerous tests with feathers under artificial conditions of heat and moisture and arrived at the conclusion that it was necessary, not only to cleanse the feathers, but also to change the nature of the feather substance, which generally speaking, is a nitrogenous protein of the keratin classification.

Detailed study of this problem and exhaustive research have resulted in my discovery of a certain practical and highly efficient method of preventing the generation of these noxious odors.

My model procedure involves what I term modification of the feathers and embraces reaction between the protein of the feathers and certain classes of chemical agents capable of combining therewith to form new compounds highly resistant to the odor developing reactions to which commercially purified feathers have always been subject heretofore and which result in inhibiting the formation of undesirable odors in the modified feathers to a point where it does not interfere with their merchantability for use in bedding.

The proteins and nitrogenous substances in feathers react readily with iodine to form combinations which resist the tendency to the generation of unpleasant odors in the presence of a high percentage of humidity and at high temperatures.

By my preferred method of treating the feathers, 300 pounds of feathers are soaked in 350 gallons of an approximately 0.4% solution of iodine in water (containing sufficient sodium iodide to keep the iodine in solution) for about four hours and then the liquor is removed and the feathers rinsed and dried.

This procedure produces especially desirable results since feathers so processed are not only modified but also because of the presence of relatively loosely combined halogen having the ability to produce microbicidal effects through the release of small amounts of halogen under the same conditions of humidity and temperature which are most favorable to the life processes of microbes.

Accordingly, desirable sterilizing effects result from the application of my improved process since such method results in the elimination, or at least reduction, of the number of microbes present, the treating agent combining with the feathers to form a new compound, for example, iodized feather protein.

Those acquainted with this art will readily comprehend that the invention is not necessarily limited or confined to the exact procedure herein set forth and that reasonable modifications thereof may be resorted to without departure from the underlying principles of the invention and without the loss or sacrifice of any of its material benefits and advantages.

This application is a division of my co-pending application Serial No. 276,443, Production of modified feathers, filed May 29, 1939.

I claim:

In the novel process of chemically modifying by iodine the feather-substance of a body of feathers having a capacity for developing an objectionable odor to prevent the possibility of such occurrence, the steps of, and in the approximate proportions stated, soaking 300 pounds of feathers in 350 gallons of a 0.4% solution of iodine and water, containing sufficient sodium-iodide to keep the iodine in solution, for about 4 hours, separating the liquor and feathers, and then rinsing and drying the treated feathers thereby rendering such iodized feathers incapable of developing an odor objectionable to the normal human sense of smell under such atmospheric conditions of temperature and relative-humidity as would create such an offensive odor in like feathers not so iodized.

ERIK HAVEMANN.